UNITED STATES PATENT OFFICE.

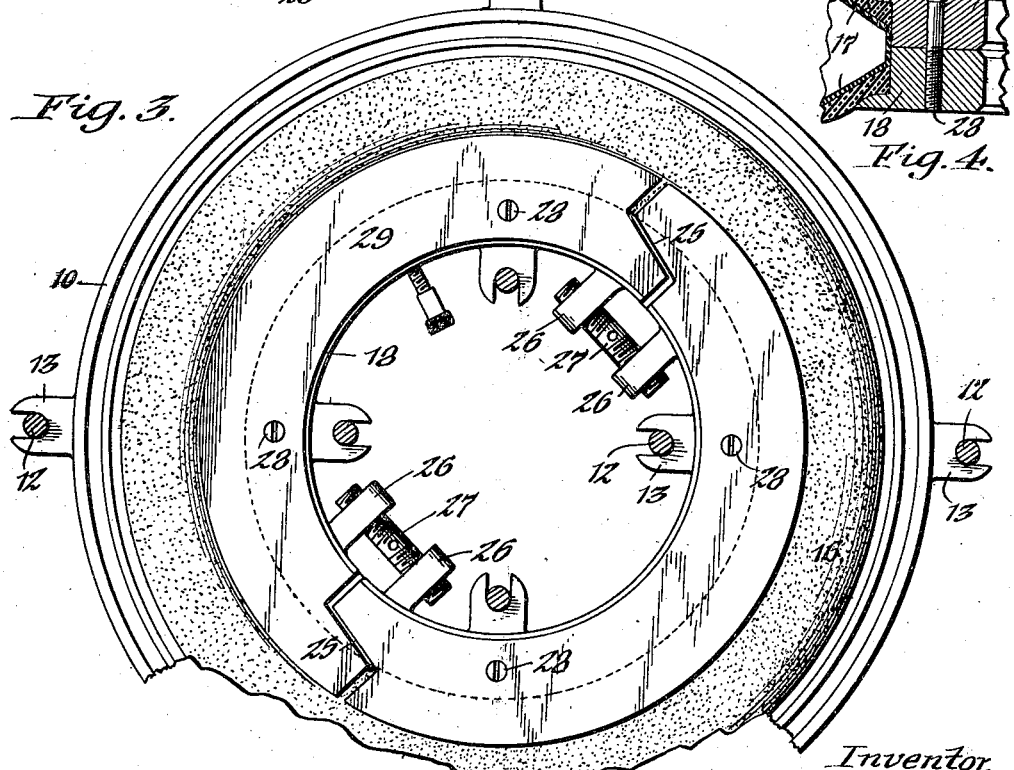

HARRY RAFLOVICH, OF BUFFALO, NEW YORK, ASSIGNOR, BY MESNE ASSIGNMENTS, TO SLOHM TIRE & MOULD CO., INC., A CORPORATION OF NEW YORK.

TIRE MOLD.

1,425,693.      Specification of Letters Patent.    Patented Aug. 15, 1922.

Application filed December 31, 1919. Serial No. 348,590.

*To all whom it may concern:*

Be it known that I, HARRY RAFLOVICH, a citizen of the United States, residing at Buffalo, in the county of Erie and State of New York, have invented new and useful Improvements in Tire Molds, of which the following is a specification.

This invention relates to a mold for vulcanizing tires and has for its object the provision of holding means which are adjustable so that they may be contracted and expanded and engaged with the inner circumferential part of tires of slightly different diameter and retain them in place within the body of the mold during the vulcanizing operation.

In the accompanying drawings:

Figure 1 is a vertical section of a tire mold embodying my invention. Figure 2 is a similar view showing the holder forming part of my invention applied to a tire. Figure 3 is a fragmentary plan view, partly in section, of my improved mold with the upper mold section removed. Figure 4 is a fragmentary section showing a modification of my invention.

Similar characters of reference indicate corresponding parts throughout the several views.

The body of this mold comprises a lower section 10 and an upper section 11 both of which are of annular form and are detachably connected by means of vertical bolts 12, engaging with corresponding lugs 13 on the inner and outer sides of said body sections.

The opposing surfaces of the body sections of the mold are constructed to form between the outer parts of these sections an annular cavity 14 which is adapted to receive the outer part of the annular tread 15 and the flanges 16 of the body of the tire when the same is of the usual horseshoe form in cross section and adapted to receive within the same an inflatable pneumatic tube 17 for holding the tire in an expanded condition within the mold cavity.

In order to hold the edges of the tire flanges in the proper position within the mold body with definiteness and certainty, a holder is provided which in its preferred form is constructed as follows:

Engaging with the inner circumferential side of the tire is an annular holder which is expansible and contractible so that the same can be readily fitted to tires which vary slightly, so far as the diameter of the circumferential inner side is concerned. In the preferred form, this holder comprises two rings 18, 18, which engage each other on their opposing inner radial sides 19 and have their peripheral faces constructed to engage with the opposite outer sides of the flanges of the tire which is being vulcanized. The tire shown in Figs. 1 and 2 is provided with annular beads 20 on the exterior of its flanges, in which case the peripheral faces of the holder rings are constructed in the form of hooks 21 which engage with these beads. In Fig. 4, however, the flanges 22 of the tire are straight sided in which case the periphery of the holder rings are provided with corresponding faces 23 to fit this form of tire.

Each of the holder rings is constructed of a plurality of sections, preferably two, as shown in the drawings, the joints between these sections being on diametrically opposite sides of the respective ring. The opposing ends of the sections of each ring preferably overlap each other, as shown at 25 and on the inner side of these sections the same are provided with inwardly-projecting pairs of lugs 26 on opposite sides of each joint. The members of each of these pairs of lugs are connected by a screw device which preferably consists of a screw 27 having right and left hand threads engaging with correspondingly threaded openings in the respective pair of lugs 26. The two corresponding sections of both holder rings are connected with each other by screws 28, as shown, or otherwise, so that they are practically one-piece. Upon turning the adjusting screws 27 in one direction or the other, the sections of the holder rings are moved toward and from each other relatively to the axis of the same, thereby contracting or expanding the holder and permitting of fitting the same to the flanges of tires which may vary somewhat in internal diameter. It is therefore possible to accommodate the holder to either new tires whose internal diameter is usually smaller, and of standard size, as well as worn tires whose internal diameter is somewhat greater due to stretching by continuous use, and this also enables the holder to be applied to different makes of tires which may vary in internal diameter.

The outer radial sides 29 of the holder rings are parallel with each other and the same engage with corresponding parallel faces 30 on the opposing inner parts of the two sections of the mold body. By this means the tire holder can be adjusted to suit tires of different internal diameter and still permit the holder to properly fit between the sections of the mold body preparatory to vulcanizing the tire by admitting steam or other heating agent into the heating chambers 31 in the body sections.

I claim as my invention:

1. A mold for vulcanizing tires comprising a holder adapted to engage the inner circumferential part of a tire and constructed to be capable of expansion and contraction, means for expanding and contracting the holder, and a mold body having sections engaging with opposite sides of said tire and holder.

2. A mold for vulcanizing tires comprising a holder having two expansible and contractible rings adapted to engage with the inner circumferential part of a tire, and a mold body having sections engaging with opposite sides of said tire and rings.

3. A mold for vulcanizing tires comprising a holder having two expansible and contractible rings which have their opposing sides engaging with each other and with the inner circumferential part of a tire, each of said rings comprising a plurality of sections, screw devices connecting the opposing ends of the ring sections, and a mold body having sections adapted to engage opposite sides of said tire and holder rings.

4. A mold for vulcanizing tires comprising a holder having two expansible and contractible rings which have their opposing sides engaging with each other and with the inner circumferential part of a tire, each of said rings comprising a plurality of sections, the opposing ends of the sections of each ring being provided with inwardly projecting lugs, and adjusting screws connecting the corresponding pairs of lugs of said ring sections.

5. A mold for vulcanizing tires comprising a holder having two expansible and contractible rings which have their opposing sides engaging with each other and with the inner circumferential part of a tire, each of said rings comprising a plurality of sections, the opposing ends of the sections of each ring overlapping each other and provided with inwardly projecting lugs, and adjusting screws having right and left threads and engaging with corresponding pairs of lugs of said ring sections.

HARRY RAFLOVICH.